C. A. WIEDENMANN.
STEERING WHEEL LOCK.
APPLICATION FILED MAY 1, 1916.

1,238,609.

Patented Aug. 28, 1917.

Witnesses
Edwin G. McKee
P. M. Smith

Inventor
C. A. Wiedenmann
By Victor J. Evans
Attorney

UNITED STATES PATENT OFFICE.

CHRISTIAN A. WIEDENMANN, OF LONG VIEW FARM, KANSAS.

STEERING-WHEEL LOCK.

1,238,609.  Specification of Letters Patent.  Patented Aug. 28, 1917.

Application filed May 1, 1916.  Serial No. 94,768.

*To all whom it may concern:*

Be it known that I, CHRISTIAN A. WIEDENMANN, a citizen of the United States, residing at Long View Farm, in the county of Bourbon and State of Kansas, have invented new and useful Improvements in Steering-Wheel Locks, of which the following is a specification.

This invention relates to steering wheel locks for use in connection with the hand controlling or steering wheels of motor vehicles, the object in view being to provide in connection with the steering column and steering wheel of such vehicle, means controlled by the operator without removing his hands from the wheel, whereby the steering wheel may be locked in fixed relation to the steering column, thereby preventing the front wheels of the machine from snatching the hand wheel out of the hands of the operator when the said front wheels strike obstructions of such a character as to throw the same suddenly to one side or the other, the device of this invention thereby adding materially to the safety of the machine and its occupants.

With the above and other objects in view, the invention consists in the novel construction, combination and arrangement of parts, as herein described, illustrated and claimed.

In the accompanying drawings:—

Figure 1:
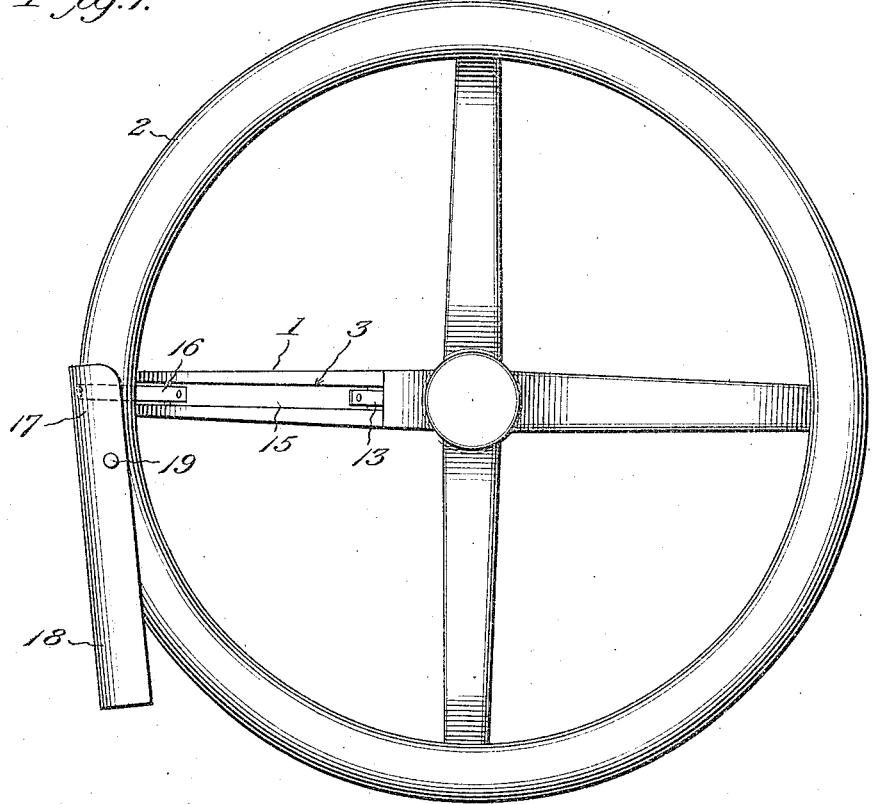
Figure 1 is a plan view of the hand steering wheel of a motor vehicle equipped with the present invention.
Figure 2:
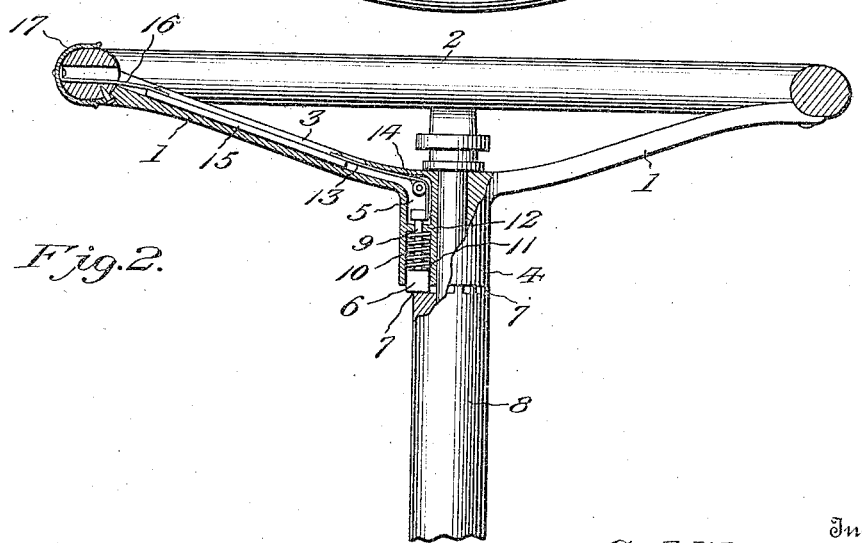
Fig. 2 is a diametrical section through the same, showing also the upper end portion of the steering column and the relation of the locking bolt thereto.

In the preferred embodiment of this invention, one of the spokes 1 of the steering wheel the rim of which is indicated at 2 is made hollow or of channeled construction to form a recess 3 the purpose of which will presently appear, and the downwardly extending hub 4 of the wheel is also recessed or channeled as indicated at 5, the channels or recesses 3 and 5 intersecting each other in the hub of the steering wheel.

Slidingly mounted in the recess 5 is a locking bolt 6 the lower extremity of which is adapted to project below the bottom of the hub 4 so as to engage one or more notches 7 in the top of the steering column a portion of which is indicated at 8, said steering column being stationary and non-rotary. The bolt 6 is reduced between its ends to form a shank 9 around which is disposed a coiled expansion spring 10 interposed between a shoulder 11 of the bolt, and a fixed shoulder 12 within the recess 5. The spring 10 serves to thrust the bolt 6 normally into engagement with the desired notch in the steering column.

Connected to the upper end of the bolt is a flexible strap or connection 13 which passes over and around an anti-friction roller 14 journaled in the inner end of the recess 3 as shown, said strap or flexible connection 13 being attached at its other end to a reciprocatory plunger 15 which is in turn connected at its outer end by means of a flexible strap 16 to the shorter arm 17 of a hand grip the longer arm of which is indicated at 18, said hand grip being in the form of a lever which is connected by a pivot 19 to the rim of the wheel. The hand grip is channeled or substantially U-shaped in cross section so as to embrace the rim of the wheel and allow the pivot 19 to extend entirely through the wheel rim and the oppositely disposed portions of the hand grip.

From the foregoing description, taken in connection with the accompanying drawings, it will now be understood that when the operator grasps the steering wheel and simultaneously grasps the hand grip, the bolt 6 is drawn out of interlocked engagement with the steering column thereby enabling the steering wheel to be freely used. When, however, the front wheels of the machine are diverted from their course by striking against an obstruction or entering a rut in the road or the like, the operator releases the hand grip and immediately the bolt 6 interlocks with the stationary or non-rotary steering column thus preventing any further rotative movement of the hand wheel. Should the hand wheel be snatched out of the hands of the operator by the front wheels of the machine when striking an obstruction, the same result will ensue, the hand grip being automatically released and the bolt being thrust by its spring into locked engagement with the steering column.

The device is primarily designed to maintain the front steering wheels of the machine in a straight ahead position so that it will be unnecessary for the operator to hold the steering wheel when traveling along a straight road. When desiring to make a turn, he grasps the hand grip and therefore unlocks the steering mechanism so that the steering wheels may be readily turned to one side or the other.

I claim:—

The combination of a fixed steering column having notches in the upper extremity thereof, a steering shaft passing longitudinally through said column, a hand steering wheel fast on said shaft and comprising a downwardly extended hub bearing upon the upper extremity of said column and formed with a guideway elongated in a direction parallel to the steering shaft, a spring thrust locking bolt slidingly mounted in said guideway and adapted to be moved into and out of engagement with said notches in the steering column, a hand grip mounted on the rim of the steering wheel and bearing a tangential relation to the latter, and flexible means connecting said hand grip and locking bolt.

In testimony whereof I affix my signature in presence of two witnesses.

CHRISTIAN A. WIEDENMANN.

Witnesses:
C. L. MOSLEY,
G. E. WHITNOT.

Copies of this patent may be obtained for five cents each, by addressing the "Commissioner of Patents, Washington, D. C."